US009686382B2

(12) United States Patent
Kejik et al.

(10) Patent No.: US 9,686,382 B2
(45) Date of Patent: Jun. 20, 2017

(54) DOUBLE DECODER SYSTEM FOR DECODING OVERLAPPING AIRCRAFT SURVEILLANCE SIGNALS

(71) Applicant: Honeywell International Inc., Morristown, NJ (US)

(72) Inventors: Petr Kejik, Brno (CZ); Jiri Princ, Brno (CZ); Milan Sopata, Cana (SK)

(73) Assignee: Honeywell International Inc., Morris Plains, NJ (US)

( * ) Notice: Subject to any disclaimer, the term of this patent is extended or adjusted under 35 U.S.C. 154(b) by 322 days.

(21) Appl. No.: 14/451,110

(22) Filed: Aug. 4, 2014

(65) Prior Publication Data

US 2016/0035226 A1 Feb. 4, 2016

(51) Int. Cl.
*G08G 5/00* (2006.01)
*H04L 29/06* (2006.01)
*H04W 4/06* (2009.01)
*H04L 1/22* (2006.01)

(52) U.S. Cl.
CPC ............... *H04L 69/22* (2013.01); *H04L 1/22* (2013.01); *H04W 4/06* (2013.01)

(58) Field of Classification Search
CPC ............. H04L 1/22; H04L 69/22; H04W 4/06
USPC ........................................................ 342/40
See application file for complete search history.

(56) References Cited

U.S. PATENT DOCUMENTS

| 4,466,077 A | 8/1984 | Iannucci et al. |
|---|---|---|
| 4,604,695 A | 8/1986 | Widen et al. |
| 5,446,743 A | 8/1995 | Zook |
| 6,243,393 B1* | 6/2001 | Fitzgerald ......... H04W 74/0833 370/332 |
| 6,567,043 B2 | 5/2003 | Smith et al. |
| 6,819,282 B1 | 11/2004 | Galati et al. |
| 7,616,149 B2 | 11/2009 | Powers et al. |
| 7,719,459 B2 | 5/2010 | Stevens et al. |
| 8,063,816 B2 | 11/2011 | Troxel |
| 8,665,985 B1 | 3/2014 | Piesinger |
| 2005/0126369 A1* | 6/2005 | Kirkeby ................... G10H 1/00 84/615 |
| 2009/0027254 A1 | 1/2009 | Troxel |
| 2010/0014615 A1 | 1/2010 | Piesinger et al. |

(Continued)

FOREIGN PATENT DOCUMENTS

WO 0059242 A1 10/2000

OTHER PUBLICATIONS

Extended Search Report from counterpart European Application No. 15178382.6, dated Dec. 16, 2015, 7 pp.

(Continued)

*Primary Examiner* — Timothy A Brainard
(74) *Attorney, Agent, or Firm* — Shumaker & Sieffert, P.A.

(57) ABSTRACT

In one example of this disclosure, two decoders perform a method for detecting and decoding overlapping radio surveillance signals. The first decoder detects a first automatic dependent surveillance-broadcast (ADS-B) preamble from a signal stream received via a front-end unit. The first decoder decodes the first ADS-B signal associated with the first ADS-B preamble. The second decoder detects a subsequent ADS-B preamble from the signal stream while the first decoder is decoding the first ADS-B signal. The second decoder decodes the subsequent ADS-B signal associated with the subsequent ADS-B preamble.

16 Claims, 6 Drawing Sheets

(56) References Cited

U.S. PATENT DOCUMENTS

| | | |
|---|---|---|
| 2010/0253565 A1 | 10/2010 | Piesinger |
| 2011/0285572 A1* | 11/2011 | Alon .................. G01S 13/78 |
| | | 342/37 |
| 2012/0068877 A1* | 3/2012 | Stayton ............... G01S 13/9303 |
| | | 342/30 |
| 2013/0082867 A1 | 4/2013 | Malaga |

OTHER PUBLICATIONS

Hall, T. et al., "Prototype ADS-B System in the Midwest: Description and Lessons Learned," 2008 ICNS Conference, May 5-7, 2008, retrieved from http://ntl.bts.gov/lib/48000/48500/48518/Prototype_ADS-B.pdf, 11 pp.

Gertz, J., "New 1090 MHz Extended Squitter Error Detection and Correction," report for RTCA Special Committee 186, Working Group 3, 1090ES WP19-02, Dec. 7, 2005, 8 pp.

RTCA, Inc., "Minimum Operational Performance Standards for 1090 MHz Extended Squitter Automatic Dependent Surveillance—Broadcast (ADS-B) and Traffic Information Services—Broadcast (TIS-B)", 2009, retrieved from http://adsb.tc.faa.gov/WG3_Meetings/Meeting31/1090-DO-260B_FRAC.pdf on Aug. 4, 2014, 24 pp.

Honeywell Int'l. Inc., "SESAR 9.21: ADS-B—1090 Higher Performance Study," ICAO ASP TSG, Jan. 2014, retrieved from http://adsb.tc.faa.gov/ICAO-TSG/TSG27-Ft.Lauderdale-2014/ASP%20TSGWP16-34-SESAR-9.21-ADS-B-1090-Higher-Performance-Study.pdf on Aug. 4, 2014, 30 pp.

Response to the Communication pursuant to Rules 70(2) and 70a(2) EPC dated Feb. 15, 2016, from counterpart European Application No. 15178382.6, filed Aug. 8, 2016, 16 pp.

\* cited by examiner

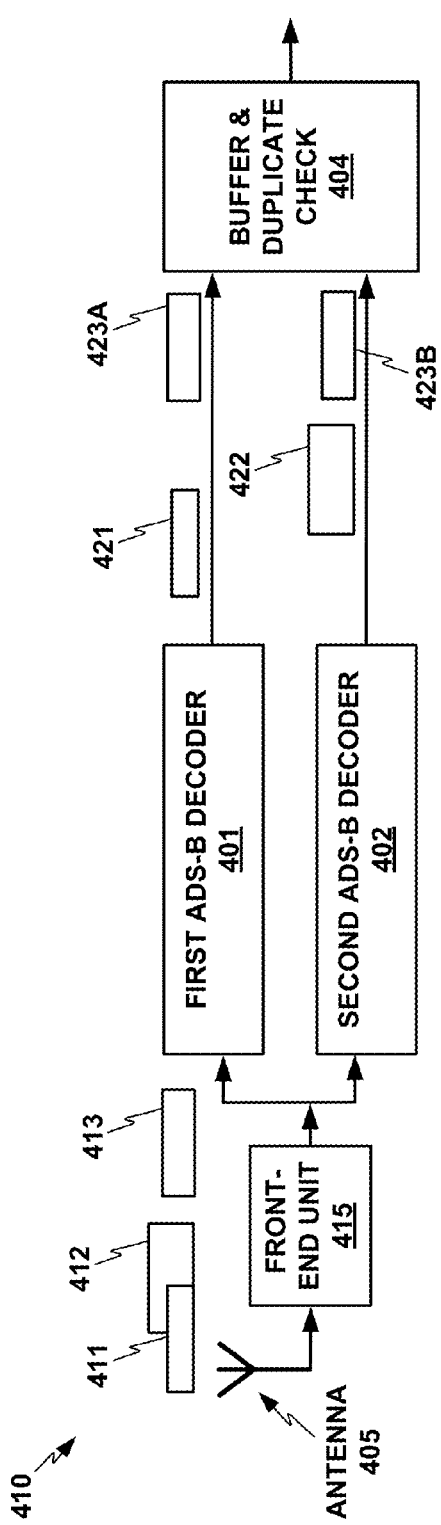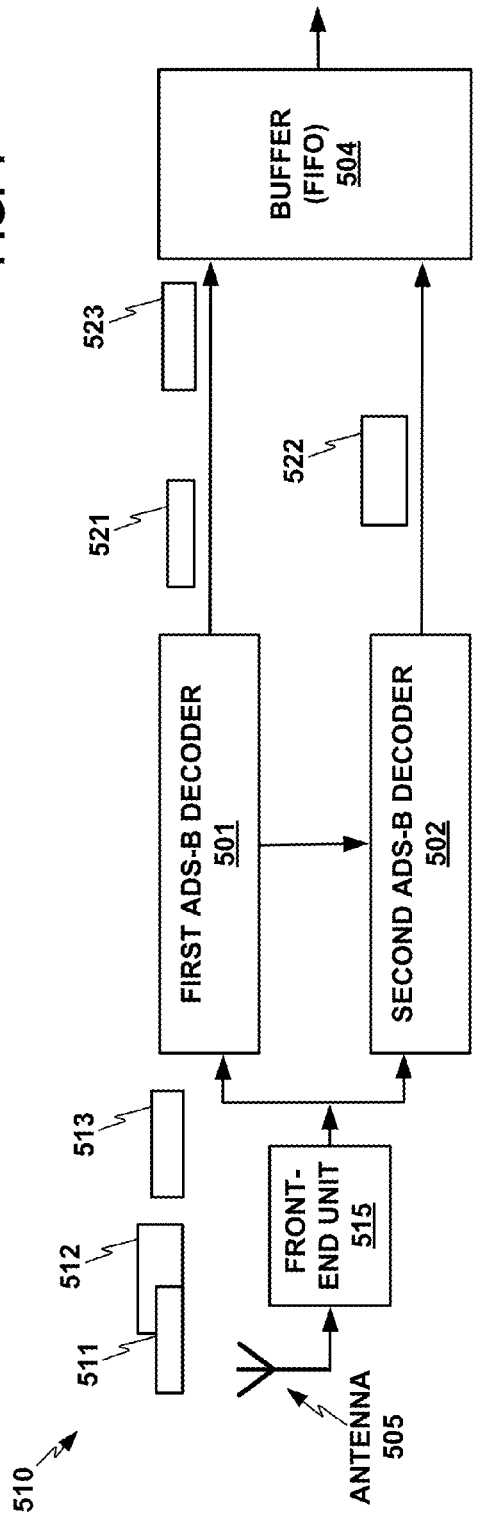

DOUBLE DECODER SYSTEM FOR DECODING OVERLAPPING AIRCRAFT SURVEILLANCE SIGNALS

This disclosure relates to radio aircraft surveillance systems.

BACKGROUND

Air traffic control systems track positions and velocities of aircraft and help prevent aircraft collisions. Air traffic control has traditionally been based on radar surveillance, supplemented more recently with cooperative radio surveillance techniques. Cooperative radio surveillance includes automatic dependent surveillance broadcast (ADS-B) technology. An aircraft's ADS-B unit includes an ADS-B compatible transmitter and/or receiver, typically operating at a Mode S band at 1,090 megahertz (MHz). The ADS-B transmitting and receiving functions are individually referred to as ADS-B Out and ADS-B In, respectively, and different requirements or standards may be applicable to ADS-B Out and ADS-B In. A particular aircraft may transmit ADS-B Out messages that include specific data (further denoted as ADS-B data), and which may be received by ground-based Air Traffic Control (ATC) stations and by other aircraft. ADS-B data may include aircraft position and velocity based on GPS, position data accuracy, aircraft identification, barometric altitude, and other data. The particular aircraft may automatically transmit ADS-B messages at a specific broadcast rate. Each ADS-B message includes a preamble and a data block. ADS-B data may be encoded into 112 bits (message data) that may be conveyed by ADS-B message data block. The particular aircraft may receive ADS-B Out messages from other aircraft in its vicinity. The aircraft's ADS-B system may make data from ADS-B messages received from other aircraft available for other systems or applications on the aircraft, such as traffic computer and display systems.

Air traffic has been increasing over the years, such that some airports now frequently have crowded air traffic. Crowded air traffic translates to a congested communication environment, with often large numbers of aircraft within range and sending ADS-B Out messages, creating a high likelihood of frequent overlap between ADS-B messages. Frequent overlap between ADS-B messages may lead to failure to decode and receive a substantial number of ADS-B messages and may degrade the performance of any applications that use ADS-B message data, which may include applications involved in situational awareness, collision avoidance, and aircraft separation management, for example.

SUMMARY

This disclosure is directed to systems, devices, and methods for aircraft surveillance communication using a double decoder system to decode overlapping aircraft surveillance signals received simultaneously from multiple transmitters, such as from multiple aircraft. A traditional ADS-B receiver system may typically lose a significant number of ADS-B messages when they are received close enough to overlap, particularly in crowded air traffic conditions such as are increasingly common near large airports. A double decoder system of this disclosure may resolve the problem of frequent loss of overlapping surveillance messages, among other advantages. A double decoder system of this disclosure may use various techniques to split up the decoding of overlapping surveillance messages between two or more decoders, thus reducing loss of valuable air traffic information, among other advantages.

An ADS-B receiver of this disclosure may include a front-end unit (that processes analog radio frequency signal and outputs digital baseband signal) and more than one decoder (that each processes the digital baseband signal and outputs binary data). The front-end unit may include an RF (Radio Frequency) front-end (e.g., analog circuits), an Analog to Digital Converter (ADC), and a signal pre-processing unit (e.g., decimation, filtering, and signal envelope detection). Each ADS-B decoder performs preamble detection (it identifies an ADS-B message within the received signal) and decodes ADS-B message data (e.g., 112 bits conveyed by ADS-B message data block). Each decoder may then output ADS-B message data to a traffic computer.

In one example, a system includes a first decoder and a second decoder. The first decoder and the second decoder are both communicatively coupled to a front-end unit. The first decoder and the second decoder are both configured to detect automatic dependent surveillance-broadcast (ADS-B) preambles from a signal stream received via the front-end unit, to decode ADS-B signals associated with the preambles, and to output ADS-B message data based on the ADS-B signals. The first decoder is configured to detect a first ADS-B preamble, and to decode a first ADS-B signal associated with the first ADS-B preamble. The second decoder is configured to attempt to detect a subsequent ADS-B preamble while the first decoder is decoding the first ADS-B signal. If the second decoder detects a subsequent ADS-B preamble while the first decoder is decoding the first ADS-B signal, the second decoder decodes a subsequent ADS-B signal associated with the subsequent ADS-B preamble.

In another example, two decoders perform a method for detecting and decoding overlapping radio surveillance signals. The first decoder detects a first automatic dependent surveillance-broadcast (ADS-B) preamble from a signal stream received via a front-end unit. The first decoder decodes the first ADS-B signal associated with the first ADS-B preamble. The second decoder detects a subsequent ADS-B preamble from the signal stream while the first decoder is decoding the first ADS-B signal. The second decoder decodes the second ADS-B signal associated with the second ADS-B preamble.

In another example, a system includes a front-end unit, a first means for decoding communicatively coupled to the front-end unit, and a second means for decoding communicatively coupled to the front-end unit. The first means for decoding and the second means for decoding both comprise means for detecting preambles from a signal stream received via the front-end unit and to decode ADS-B message data from the signals. The system includes means for detecting a first radio surveillance preamble from a signal stream received via a front-end unit and means for decoding the first radio surveillance signal associated with the first radio surveillance preamble. The system also includes means for detecting a subsequent radio surveillance preamble while the means for decoding the first radio surveillance signal is decoding the first radio surveillance signal and means for decoding a subsequent radio surveillance signal associated with the subsequent radio surveillance preamble.

The details of one or more examples are set forth in the accompanying drawings and the description below. Other features, objects, and advantages will be apparent from the description and drawings, and from the claims.

BRIEF DESCRIPTION OF DRAWINGS

FIG. 4 depicts a communication processing system in accordance with an example of this disclosure.

FIG. 5 depicts a communication processing system in accordance with another example of this disclosure.

DETAILED DESCRIPTION

Various examples are described below generally directed to devices, integrated circuits, systems, and methods for a double decoder system to decode overlapping aircraft surveillance messages. As noted above, a double decoder system of this disclosure may use various techniques to split up the decoding of overlapping ADS-B messages between two or more decoders (which may use either the same or various different decoding techniques), thus reducing loss of valuable air traffic information, and supporting performance of applications that use ADS-B messages, such as situational awareness, collision avoidance, and aircraft separation management applications. Furthermore, because separation standards for collision avoidance must compensate for information loss due to factors such as loss of overlapping surveillance messages, by reducing or eliminating loss of information from overlapping surveillance messages, a system of this disclosure may further enable reducing surveillance transmission requirements, easing of implementation of separation standards for collision avoidance, and higher fuel efficiency and fewer delays due to eased separation standards for collision avoidance, among other advantages.

Figure 1:
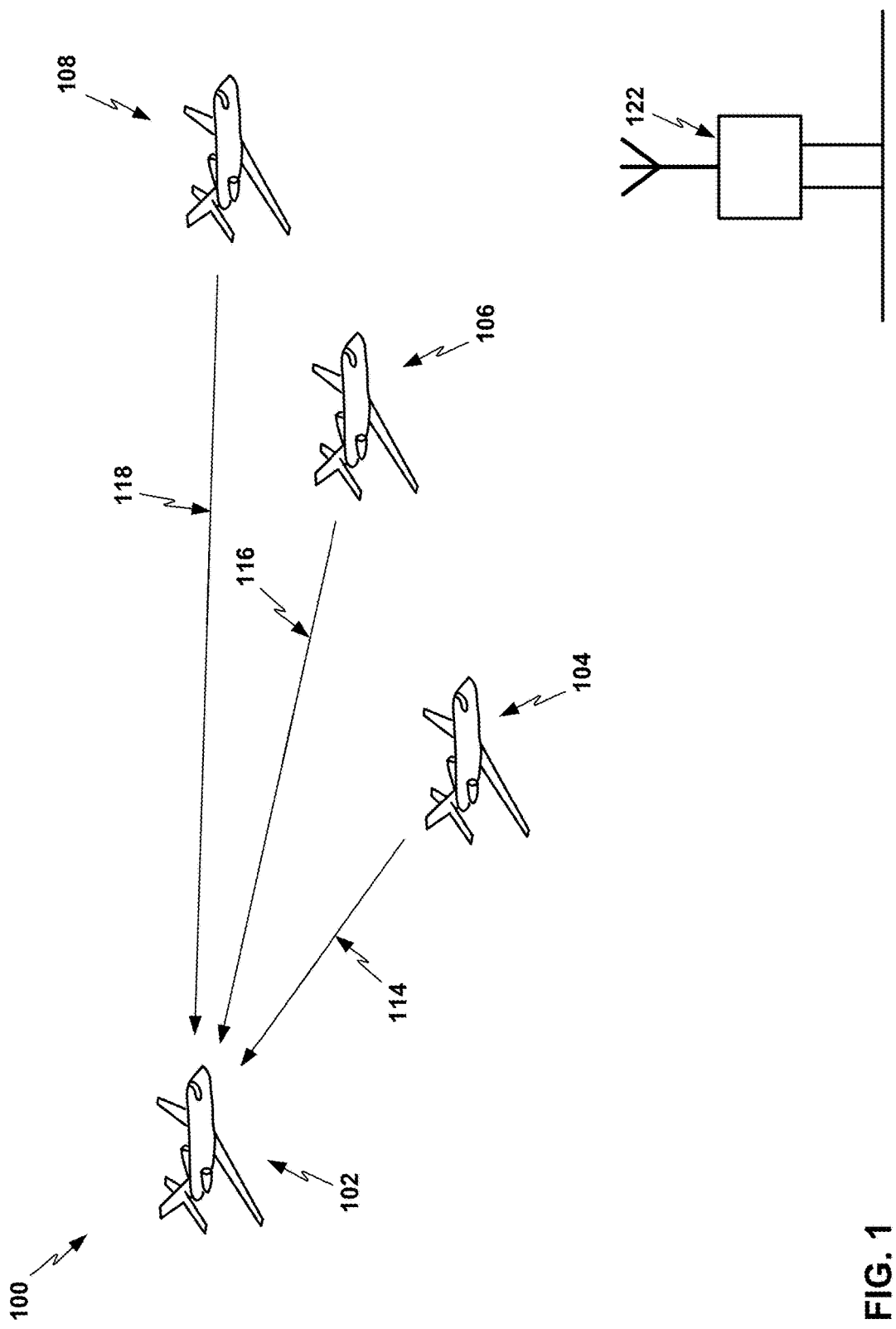
FIG. 1 depicts a conceptual diagram of an example air traffic environment in which example aircraft are flying relatively near each other, such as on approach to an airport.

FIG. 1 depicts a conceptual diagram of an example air traffic environment 100 in which example aircraft 102, 104, 106, 108 are flying relatively near each other, such as on approach to an airport with a ground-based air traffic control (ATC) station 122. Aircraft 102, 104, 106, 108 each broadcast ADS-B signals encoding ADS-B messages. The ADS-B messages include ADS-B data such as position data, position data accuracy, aircraft identification, barometric altitude, and other data provided to each aircraft's ADS-B transmitter from other aircraft systems (e.g., position data may be provided by an on-board GPS receiver).

Air traffic con rot station 122 may receive ADS-B signals from the various aircraft 102, 104, 106, 108 in its vicinity. An individual aircraft, such as aircraft 102, may also be configured with an ADS-B In system to receive ADS-B signals from the other aircraft around it, such as ADS-B signals 114, 116, 118 from aircraft 104, 106, 108 respectively, as shown in FIG. 1. In either case, air traffic control station 122 or aircraft 102 may attempt to decode ADS-B messages from as many of the aircraft as possible, ideally from all of the aircraft in the vicinity (or from all the other aircraft in the vicinity, in the case of an ADS-B system onboard one of the aircraft).

Situations with a high volume of air traffic translate to a high volume of ADS-B radio traffic as well, such that some of the ADS-B signals are received at overlapping times and the signals collide or interfere with each other. In traditional ADS-B systems, collisions typically result loss of at least one of the messages encoded in each set of overlapping signals, such that cumulatively, many ADS-B messages may be lost. The more air traffic there is, the more sparse the data from each individual aircraft becomes, and the higher the odds become for a gap in data from any given aircraft. Gaps in ADS-B data from a particular aircraft mean that the performance of the corresponding ATM (Air Traffic Management) applications, in operation within air traffic control station 122 or aircraft 102, may be degraded (e.g., lose track of the position and heading of that particular aircraft).

Systems and techniques of this disclosure may reduce or eliminate this loss of data by using a double decoder architecture and associated decoding methods to enable or increase the probability of reception and decoding of multiple ADS-B messages from overlapping signals, in environments with a high volume of air traffic. Systems and techniques of this disclosure may be implemented by air traffic control station 122 and/or in an ADS-B in system onboard an aircraft, such as aircraft 102, an example of which is described below with reference to FIG. 2.

Figure 2:
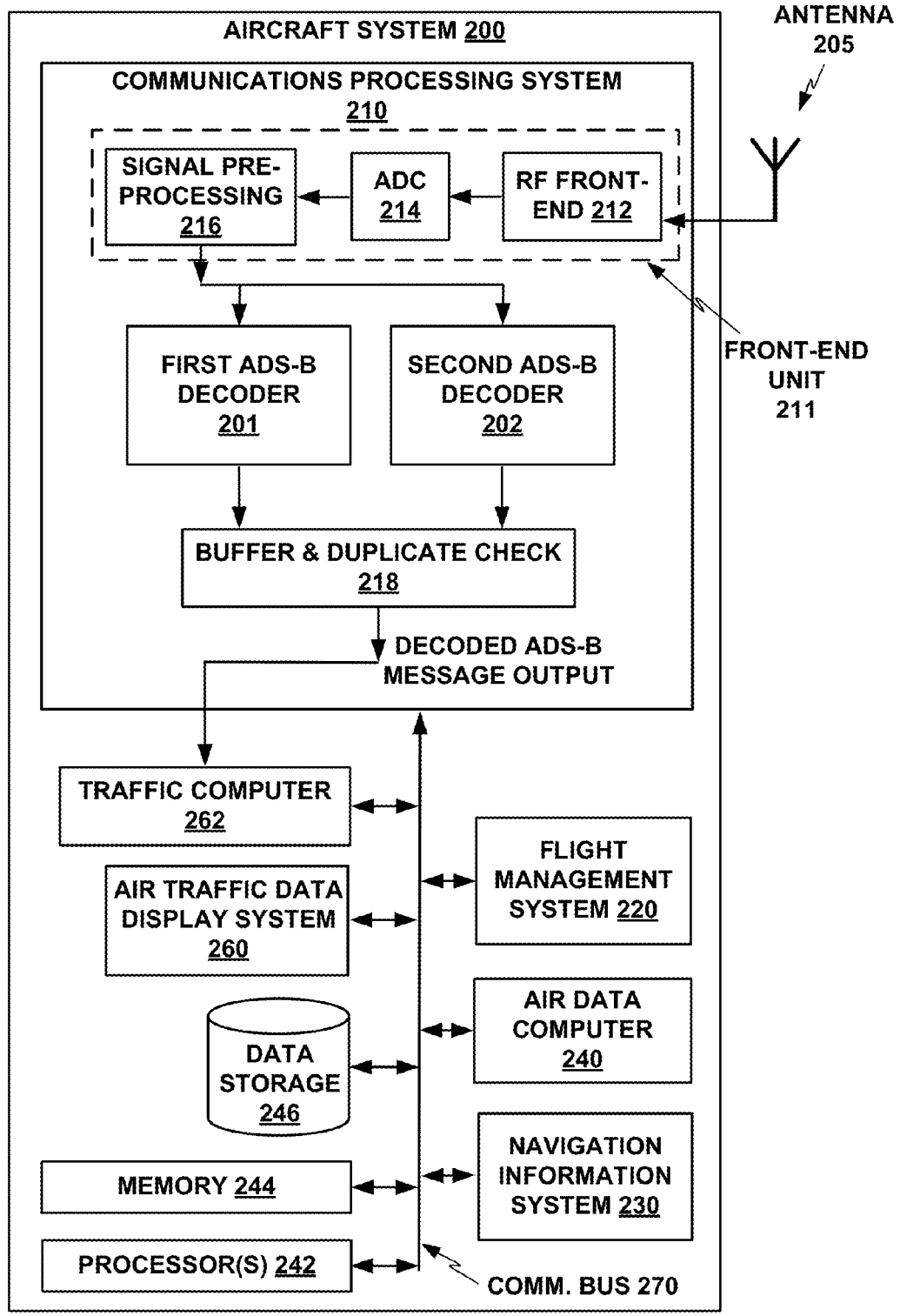
FIG. 2 depicts a functional block diagram of an example aircraft system that includes a double decoder communications processing system with a first decoder and a second decoder.

FIG. 2 depicts a functional block diagram of an example aircraft system 200 configured to operate a double decoder communications processing system 210 with a first ADS-B decoder 201 and a second ADS-B decoder 202. Aircraft system 200 with double decoder communications processing system 210 may be implemented onboard an aircraft such as aircraft 102 of FIG. 1 as described above. Communications processing system 210 is coupled to an antenna 205, or potentially to more than one antenna in some examples. Antenna 205 is coupled to front-end unit 211. First decoder 201 and second decoder 202 are coupled to front-end unit 211.

Communications processing system 210 in this example also includes radio frequency (RF) front-end 212, analog-to-digital converter (ADC) 214, and signal pre-processing block 216 operatively coupled between antenna 205 and first and second decoders 201, 202. Front-end unit 211, including RF front-end 212, ADC 214, and signal pre-processing block 216, may collectively be considered a front-end to first and second decoders 201, 202. Communications processing system 210 in this example also includes buffer and duplicate check block 218 coupled to the output nodes of first and second decoders 201, 202. RF front-end 212 may include analog circuits for initial amplifying, filtering, and/or other conditioning of incoming radio signals received via antenna 205. Signal pre-processing block 216 may be configured to perform down-conversion, decimation, filtering, and/or signal envelope detection, for example.

Each of first and second decoders 201, 202 may output decoded ADS-B messages data as decoded from ADS-B signals in the signal stream as received via antenna 205 and processed by front-end unit 211. First and second decoders 201, 202 may be implemented in software in some examples, as separate first and second objects, blocks, or modules of software that perform the functions of decoders. First and second decoders 201, 202 may be implemented as separate hardware components in some examples, or various aspects of decoders 201, 202 may be implemented across both hardware and software (e.g., separate decoder hardware components with different decoder software modules executed by each decoder hardware component).

Buffer and duplicate check block 218 may temporarily or transiently store or buffer ADS-B message data outputted by first and second decoders 201, 202, check whether first and second decoders 201, 202 output duplicates of a single ADS-B message data, and/or output or communicate the ADS-B message data (and may output or communicate a single copy of a set of ADS-B message data from ADS-B message data if it receives duplicate copies from both of first and second decoders 201, 202). The output of buffer and duplicate check block 218 may therefore include single copies of each of a series of ADS-B message data, which may consist of binary data with 112 bits (or 88 bits excluding cyclic redundancy check bits) per ADS-B message. In other examples of this disclosure, a buffer may output decoded surveillance message data with other bit lengths, formats, or protocols. The duplicate check aspects of buffer and duplicate check block 218 may be implemented in duplicate checking logic embodied as software, hardware, or both, in various examples. The buffer aspects of buffer and duplicate check block 218 may include logic to make sure to store ADS-B message data long enough to perform a duplicate check for whether an initial instance of a set of ADS-B message data outputted by one of the decoders 201, 202 is also outputted by the other of decoders 201, 202 within a nominal lag time.

In some examples, a buffer without a duplicate check may be used in place of buffer and duplicate check block 218, e.g., where the decoders include functions that inherently prevent duplicate decoding of the same ADS-B message data in the first place (further described below with reference to FIG. 5). In these examples, the buffer may operate in accordance with first-in-first-out (FIFO) and without additional logic to ensure that each set of ADS-B message data is retained in the buffer at least long enough to check whether a duplicate of the same ADS-B message data is generated by the other decoder.

Buffer and duplicate check block 218 may output ADS-B message data to traffic computer 262. Traffic computer 262 may process ADS-B data (among other data inputs in accordance with various implementations) and may output application specific output data to a communication bus 270.

In addition to communications processing system 210, aircraft system 200 in the illustrative example of FIG. 2 may also include flight management system 220, navigation information system 230, air data computer 240, and air traffic data display system 260, in this example. Other systems may be included and other configurations may be utilized in a wide variety of other examples of aircraft systems (not depicted). Aircraft system 200 may also include one or more processors 242, memory 244, and data storage 246, which may be included as part of communications processing system 210, air data computer 240, flight management system 220, navigation information system 230, or as part of or in addition to other systems or components, in the illustrative example of FIG. 2, while a wide variety of other configurations may be used in other examples of aircraft systems. Aircraft system 200 may also include any of various sensors coupled to air data computer 240, flight management system 220, and/or potentially also coupled to any of the systems or components of aircraft system 200. Aircraft system 200 may also include a communication bus 270, which may include a data bus or networking system that may interconnect the various systems and components of aircraft system 200 as illustratively shown in FIG. 2.

One or more processors 242 and/or memory 244 and/or data storage 246 may be part of communications processing system 210 and/or be coupled to communications processing system 210, and may store, execute, and/or embody algorithms that may assign incoming signals to one or the other of first decoder 201 or second decoder 202, or otherwise contribute to receiving and processing incoming signals, as further described below. Buffer and duplicate check block 218 may be implemented with any of various configurations of memory hardware and memory management software, in different examples. Communications processing system 210 may also include hardware components that perform or embody any of various functions for receiving and processing incoming signals in some examples, including any functions that may be performed, executed, or embodied by algorithms stored and/or processed by one or more processors 242 and/or memory 244 and/or data storage 246 as indicated above. Communications processing system 210 may receive and process incoming ADS-B signals via either or both of first decoder 201 and second decoder 202, as further described below. Particularly in conditions of heavy air traffic, communications processing system 210 may receive incoming ADS-B signals at the same time so that the incoming ADS-B signals are overlapping, as described below with reference to FIG. 3.

Communications processing system 210 may output ADS-B message data to traffic computer 262, through a communication bus (which may be implemented using communication bus 270 or through a dedicated communication bus). Communications processing system 210 and/or traffic computer 262 may make the ADS-B message data available to one or more components of aircraft system 200 and/or to one or more applications running on or being executed by one or more components of aircraft system 200, potentially such as air data computer 240, air traffic data display system 260, and/or flight management system 220. For example, flight management system 220 may use incoming ADS-B message data to track the positions and velocities of surrounding aircraft and to calculate (independently of and redundantly with air traffic control station 122) whether a potential need arises to alter course to maintain a safe distance from other aircraft. As another example, air traffic data display system 260 may use incoming ADS-B message data to display icons or representations of surrounding aircraft (e.g., on an electronic flight bag (EFB)).

Navigation information system 230 may include, e.g., an Inertial Navigation System (INS), a Global Positioning System (GPS), or any combination thereof. Navigation information system 230 and/or other components of aircraft system 200 may include ADS-B Out transmission preparation and processing functions that enable aircraft system 200 to transmit ADS-B messages, as described above. Aircraft system 200 may include a primary flight display (PFD), a multifunction display (MFD), a navigation display, an electronic flight bag (EFB), or any other suitable display, one or more of which may be part of air traffic data display system 260. Data storage 246 may include one or more hard disk drives, one or more flash drives, and/or one or more additional nonvolatile or more or less long-term data storage devices. Memory 244 may include random access memory (RAM) integrated circuits, cache circuits, and/or one or more volatile or more or less short-term data storage devices. Data storage 246 and/or memory 244 may also include one or more devices or systems that may function or be used as either long-term data storage and/or short-term memory. In some examples, data storage 246, memory 244, and/or processors 242 may be used to implement a software-defined communications processing unit that implements some features of this disclosure.

Figure 3:
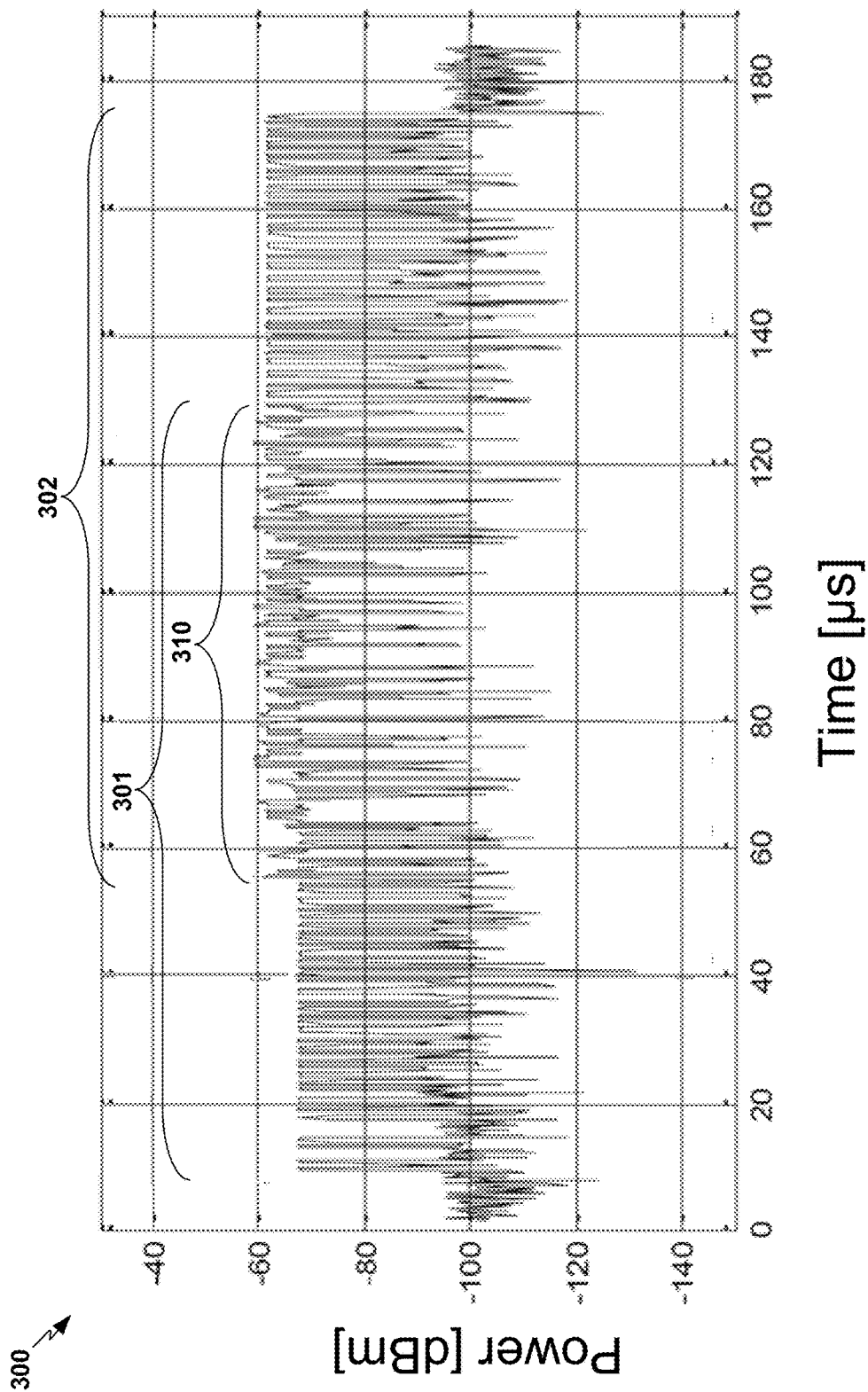
FIG. 3 shows a radio input containing two overlapping ADS-B signals that may be received and decoded by at least one of decoders of communications processing system as shown in FIG. 2, in accordance with illustrative aspects of this disclosure.

FIG. 3 shows a radio input 300 containing two overlapping ADS-B signals 301, 302 that may be received by antenna 205, processed by front-end unit 211 and decoded by at least one of decoders 201, 202 of communications processing system 210 as shown in FIG. 2. Decoders 201, 202 may be more likely to decode overlapping ADS-B signals 301, 302 in conditions of busier air traffic, such as near a busy airport, especially during times of peak traffic. Radio input 300 is shown in terms of power in decibel-milliwatts (dBm, y-axis) over time in microseconds (μs, x-axis). ADS-B signals 301, 302 are superimposed together during an overlapping ADS-B signal segment 310 within radio input 300. The ADS-B signals 301, 302 each encode a set of ADS-B message data. Each ADS-B includes a preamble (of a length of 8 μs) and a data block (of a length of 112 μs). The preamble includes four pulses that precede the data block. The preamble pulses are used for message detection in an incoming radio stream. The data block consists of 112 bits of message data (e.g., encoded ADS-B data).

The superposition of multiple ADS-B signals 301, 302 within an incoming radio signal as received by communications processing system 210 may complicate the task of decoding ADS-B signals 301, 302 to obtain the ADS-B message data contained therein, such that a single receiver in a traditional communications processing system normally would at best be able to decode only one of ADS-B signals 301, 302. In a traditional communications processing system receiving radio input 300 with overlapping ADS-B signals as shown in FIG. 3, a receiver may only decode the ADS-B signal with the highest power or amplitude, which would be the second ADS-B signal 302 in this example. In contrast, communications processing system 210 of this disclosure may decode both of the overlapping ADS-B signals 301, 302 and output the ADS-B message data encoded in both of the overlapping ADS-B signals 301, 302. Communications processing system 210 of this disclosure may use any of various techniques to direct or assign overlapping ADS-B signals to different decoders, and to decode overlapping ADS-B signals received at the same time or received at overlapping times with different decoders. For example, communications processing system 210 of this disclosure may use first decoder 201 to decode ADS-B signal 301 and use second decoder 202 to decode ADS-B signal 302. Techniques for decoding overlapping ADS-B signals are further discussed below with reference to FIG. 4.

FIG. 4 depicts communication processing system 410 in accordance with an example of this disclosure. Communication processing system 410 includes antenna 405, front-end unit 415, first decoder 401, second decoder 402, and buffer 404. Both decoders 401, 402 may use the same antenna 405 and front-end unit 415, including, the same RF front-end (e.g., analog circuits), the same ADC, and the same signal pre-processing (e.g., decimation, filtering, signal envelope detection) (not individually depicted in FIG. 4). Front-end unit 415 is coupled to antenna 405. First decoder 401 and second decoder 402 are communicatively coupled to front-end unit 415. Buffer 404 is communicatively coupled to first decoder 401 and second decoder 402. Communication processing system 410 may be analogous in at least some ways to communication processing system 210 as shown in FIG. 2. Communication processing system 410 of FIG. 4 may in some examples incorporate additional components such as those depicted in FIG. 2 and/or other components, such as amplifiers and filters, for example.

Antenna 405 receives ADS-B signals 411, 412, and 413 (depicted as conceptual blocks in FIG. 4). Antenna 405 receives ADS-B signals 411 and 412 at overlapping times such that ADS-B signals 411 and 412 are overlapping. In particular, antenna 405 first begins receiving ADS-B signal 411, then begins receiving ADS-B signal 412 while it is also still in the process of receiving ADS-B signal 411, such that ADS-B signals 411 and 412 are overlapping in the incoming radio signal stream through antenna 405. Antenna 405 begins receiving ADS-B signal 413 subsequent to the end of receiving ADS-B signal 412, such that ADS-B signal 413 is non-overlapping.

First decoder 401 and second decoder 402 are both configured to detect ADS-B preambles from signals received via antenna 405, such as ADS-B signals 411, 412, 413, and processed by front-end unit 415. First decoder 401 and second decoder 402 are both further configured to decode ADS-B messages from the signals received via antenna 405, such as ADS-B signals 411, 412, 413, and processed by front-end unit 415. However, first decoder 401 and second decoder 402 may be configured to operate in accordance with different techniques, algorithms, or methods with relation to incoming ADS-B signals. For example, first decoder 401 and second decoder 402 may use various techniques for decoding the message data content (ADS-B message data). In some examples, first decoder 401 may utilize specialized pre-generated look-up tables in order to decode the data content of the message 411 even if it is overlapped by message 412 (decoding of such overlapped message is not in accordance with the DO-260B standard (or EUROCAE ED-102A, the European equivalent) for 1900 ES promulgated by the Radio Technical Commission for Aeronautics (RTCA) and the Federal Aviation Administration (FAA), which is incorporated by reference herein). The second decoder 402 may utilize another decoding algorithm e.g., a decoding algorithm in accordance with the DO-260B/ED-102A standard) in order to decode the data content of the message 412 that overlaps message 411 (decoding of such overlapping messages may be performed in accordance with the DO-260B/ED-102A standard).

In one example, first decoder 401 may be configured to monitor an incoming signal stream to detect an ADS-B preamble and, once first decoder 401 detects an ADS-B preamble, first decoder 401 begins decoding the ADS-B signal associated with that preamble, and does not attempt to detect any additional ADS-B preambles white it is decoding that ADS-B signal (e.g., ADS-B signal 411). Instead, first decoder 401 continues decoding ADS-B signal 411 until ADS-B signal 411 is finished and first decoder 401 has finished decoding ADS-B signal 411. The processing of first decoder 401 beginning to decode an ADS-B signal in response to detecting an ADS-B trigger may be referred to as triggering. If a new, overlapping ADS-B (e.g., ADS-B signal 412) begins in the incoming signal stream once first decoder 401 is already in the process of decoding ADS-B signal 411, first decoder 401 takes no action on and effectively ignores the new, overlapping ADS-B signal 412, and continues decoding the first ADS-B signal 411 until it is finished decoding the first-received ADS-B signal 411.

At the same time, second decoder 402 may also be configured to receive and monitor the same incoming signal stream from antenna 405 processed by front-end unit 415, and to attempt to detect ADS-B preambles in the signal stream. Once second decoder 402 detects an ADS-B preamble, such as from ADS-B signal 411, second decoder 402 triggers and begins decoding the ADS-B signal associated with that preamble. However, second decoder 402 may also continue scanning the incoming radio signal for additional ADS-B preambles, and attempting to detect additional ADS-B preambles, while it is in the process of decoding a first ADS-B signal, e.g., ADS-B signal 411. If second decoder 402 detects a subsequent ADS-B preamble, e.g., from ADS-B signal 412, in the incoming radio signal stream from antenna 405 while second decoder 402 is in the process of decoding the first ADS-B signal 411, second decoder 402 stops or abandons the process of decoding first ADS-B signal 411, and begins decoding the subsequent ADS-B signal 412 instead. This process of detecting a subsequent ADS-B preamble within an ADS-B decoding run and interrupting its existing decoding process to begin to decode a subsequent ADS-B signal may be referred to as re-triggering. Thus, first decoder 401 is configured not to re-trigger, while second decoder 402 is configured to re-trigger, in this example.

In the example as depicted in FIG. 4, therefore, first decoder 401 decodes ADS-B signal 411, and second decoder 402 decodes ADS-B signal 412. Each of first and second decoders 401 and 402 may output decoded ADS-B message data embodying ADS-B messages as the result of their processing of incoming ADS-B signals, and communicate the decoded ADS-B message data to buffer 404. In particular, in this example, first decoder 401 may output ADS-B message data embodying ADS-B message 421 as the result of decoding ADS-B signal 411, and communicate ADS-B message data embodying ADS-B message 421 to buffer 404, while second decoder 402 may output ADS-B message data embodying ADS-B message 422 as the result of decoding ADS-B signal 412, and communicate ADS-B message data embodying ADS-B message 422 to buffer 404. A decoder or buffer outputting or communicating ADS-B message data embodying an ADS-B message may be described herein in equivalent terms of the decoder or buffer outputting or communicating the ADS-B message or a set of ADS-B message data, and the set of ADS-B message data corresponding to ADS-B message 421 may also be referred to simply as ADS-B message data 421, and similarly for other ADS-B message data.

Another ADS-B signal 413 may be received via antenna 405 without any overlap by another ADS-B signal, as also shown in FIG. 4. First and second decoders 401 and 402 may both receive ADS-B signal 413, detect the preamble for ADS-B signal 413, and proceed to decode ADS-B signal 413, in this example. Since no subsequent ADS-B signal arrives in the signal stream via antenna 405 during decoding of ADS-B signal 413, second decoder 402 does not re-trigger, and decodes ADS-B signal 413 to completion in parallel with first decoder 401. First and second decoders 401 and 402 thus both output decoded ADS-B messages data 423A, 423B, respectively, from ADS-B signal 413. First and second decoders 401 and 402 then both communicate ADS-B message data 423A, 423B, respectively, based on ADS-B signal 413 to buffer 404.

Buffer 404 may be configured to check for duplicate message data in this example. Buffer 404 may receive ADS-B message data 421 from first decoder 401 and ADS-B message data 422 from second decoder 402, check for duplicate message data, and confirm that each of ADS-B messages data sets 421 and 422 do not have duplicate message data, before communicating ADS-B message data 421 and 422 to a downstream component, e.g., traffic computer 262. Buffer 404 may receive the sets of ADS-B message data 423A and 423B and perform a duplicate check that indicates that ADS-B message data sets 423A and 423B are duplicate message data, in which case buffer 404 may reject one of the duplicates and communicate only a single copy of ADS-B message data 423A and 423B to a downstream component, e.g., traffic computer 262. Buffer 404 may thereby prevent the downstream components from extraneously processing the same ADS-B message data more than once, and prevent unnecessary processing burden, in this example.

FIG. 5 depicts communication processing system 510 in accordance with another example of this disclosure. Communication processing system 510 is analogous in some ways to communication processing system 410 of FIG. 4 as discussed above, and also has substantial differences. Communication processing system 510 includes antenna 505, front-end unit 515, first decoder 501, second decoder 502, and buffer 504. Front-end unit 515 is coupled to antenna 505. First decoder 501 and second decoder 502 are communicatively coupled to front-end unit 515, and buffer 504 is communicatively coupled to first decoder 501 and second decoder 502. Communication processing system 510 of FIG. 5 may in some examples incorporate additional components such as amplifiers and filters, for example.

Antenna 505 receives ADS-B signals 511, 512, and 513. Antenna 505 receives ADS-B signals 511 and 512 at overlapping times such that ADS-B signals 511 and 512 are overlapping. In particular, antenna 505 first begins receiving ADS-B signal 511, then begins receiving ADS-B signal 512 while it is also still in the process of receiving ADS-B signal 511, such that ADS-B signals 511 and 512 are overlapping in the incoming radio signal stream through antenna 505. Antenna 505 begins receiving ADS-B signal 513 subsequent to the end of receiving ADS-B signal 512, such that ADS-B signal 513 is non-overlapping.

First decoder 501 and second decoder 502 are both configured to detect ADS-B preambles from signals received via antenna 505, such as ADS-B signals 511, 512, 513, and processed by front-end unit 515. First decoder 501 and second decoder 502 are both further configured to decode ADS-B signals into ADS-B messages embodying ADS-B message data from the ADS-B signals received via antenna 505, such as ADS-B signals 511, 512, 513, after the incoming ADS-B signal stream is processed by front-end unit 515. As in the example of FIG. 4, first decoder 501 may be configured without re-triggering and second decoder 502 may be configured with re-triggering, such that, once first decoder 501 detects an ADS-B preamble in the incoming signal stream from antenna 505, first decoder 501 decodes the ADS-B signal (e.g., ADS-B signal 511) associated with that preamble without attempting to detect any additional ADS-B preambles while it is decoding ADS-B signal 511.

In the example of FIG. 5, communication processing system 510 also includes an enabling function between first decoder 501 and second decoder 502. In one example, second decoder 502 (e.g., its preamble detection logic) may be deactivated by default, and only activated when enabled by first decoder 501. First decoder 501 may enable second decoder 502 (e.g., its preamble detection logic) when first decoder 501 has detected an ADS-B preamble and is in the course of processing the ADS-B signal associated with that preamble, e.g., ADS-B signal 511. In this case, second decoder 502 is then active and monitoring the incoming radio stream while first decoder 501 is decoding first ADS-B signal 511, such that second decoder 502 detects the preamble of subsequent ADS-B signal 512, which arrives in the incoming signal stream while first decoder 501 is occupied with decoding first ADS-B signal 511. Second decoder 502 thus begins decoding ADS-B signal 512 while first decoder 501 is still finishing decoding ADS-B signal 511. First and second decoders 501 and 502 thus decode both of the overlapping ADS-B signals 511 and 512. First decoder 501 outputs ADS-B message data 521 based on ADS-B signal 511, and second decoder 502 outputs ADS-B message data 522 based on ADS-B signal 512.

After second decoder 502 has finished decoding ADS-B signal 512, first decoder 501 is already finished with its decoding ADS-B signal 511 and is actively attempting to detect new preambles in the incoming signal stream. Because first decoder 501 is not occupied with a decoding task and is actively monitoring the incoming signal stream, the enabling function of communication processing system 510 returns second decoder 502 to an inactive state, such that second decoder 502 is not actively monitoring the incoming signal stream and attempting to detect new preambles in the signal stream. Another ADS-B signal 513 may then appear in the signal stream, and first decoder 501 may detect the preamble of ADS-B signal 513 and then begin decoding ADS-B signal 513. Because first decoder 501 is not occupied with a decoding task and is actively monitoring the incoming signal stream when ADS-B signal 513 arrives in the signal stream, second decoder 502 is disabled and does not detect the preamble of or decode ADS-B signal 513. Communication processing system 510 enables second decoder 502 while first decoder 501 is occupied with decoding ADS-B signal 513, and second decoder 502 attempts to detect new signal preambles in the signal stream white first decoder 501 is occupied with decoding ADS-B signal 513. However, no additional signal arrives in the signal stream during the decoding of ADS-B signal 513, and communication processing system 510 may disable second decoder 502 again in response to first decoder 501 finishing decoding ADS-B message data embodying ADS-B message 523 based on ADS-B signal 513. First decoder 501 returns to actively attempting to detect new ADS-B preambles after it has finished its decoding of ADS-B signal 513.

Thus, in the example of FIG. 5, unlike in the example of FIG. 4, the combination of first decoder 501 and second decoder 502 does not generate duplicate copies of ADS-B message data in response to incoming ADS-B signals that do not overlap. Since communication processing system 510 in the example of FIG. 5 may thus ensure that the combined decoders 501, 502 do not send duplicate copies of ADS-B message data to buffer 504, buffer 504 may also be configured without a function of checking for and rejecting duplicate copies of ADS-B message data (in contrast to buffer and duplicate check block 218 of FIG. 2, for example). Instead, buffer 504 in the example of FIG. 5 may be configured simply as first-in-first-out (FIFO), which may be simpler to implement.

The enabling function of communication processing system 510 to enable or disable second decoder 502 (e.g., its preamble detection logic) depending on whether first decoder 501 is occupied with a decoding task may be timed appropriately to ensure a hand-off of monitoring between decoders, such that second decoder 502 is not disabled until first decoder 501 is once again monitoring the incoming signal stream and attempting to detect new ADS-B preambles. The enabling function of communication processing system 510 to enable or disable second decoder 502 may be implemented in software, hardware, or a combination thereof, in different examples, and may be implemented in hardware and/or software with which first decoder 501 is implemented, in some examples.

In some examples, a communications processing system of this disclosure may also include more than two ADS-B decoders (not depicted). For example, a communications processing system of this disclosure may include first, second, and third ADS-B decoders, all three of which are configured to process an incoming radio stream received by an antenna and processed by the front-end unit. The first and second ADS-B decoders may operate in accordance with any of the examples of FIGS. 2, 4, and 5 as described above, while the third ADS-B decoder may operate differently than either of the first and second decoders, in a way that further diversifies coverage of and further increases chances of successfully receiving overlapping ADS-B signals, including in situations with three overlapping ADS-B signals.

For example, the third decoder may be configured to detect an ADS-B preamble from the incoming data stream and begin decoding the ADS-B signal associated with the detected ADS-B preamble, as also performed by the first and second decoders. The third decoder may be configured with an initial re-triggering capability, to continue monitoring the incoming radio stream during decoding of a first ADS-B signal to detect any subsequent ADS-B preamble during the decoding, and then to respond to detecting of a subsequent preamble by abandoning decoding the first ADS-B signal and instead beginning to decode the subsequent ADS-B signal. In this way, the third decoder is configured similarly to the second decoder 402, 502 as described above.

However, the third decoder may be configured to stop monitoring the radio stream, to stop trying to detect additional preambles after its first interrupt and re-trigger, and to decode the first subsequent ADS-B signal to completion. Thus, in contrast to a first decoder that is not configured with re-triggering, and to a second decoder that is configured with a continuous re-trigger (i.e., to continue re-triggering during decoding of an ADS-B signal, which may be performed in accordance with the DO-260B/ED-102A standard), the third decoder is configured with just a single re-trigger (i.e., to re-trigger once and then to refrain from re-triggering again during decoding of an ADS-B signal), in this way, a communications processing system of this disclosure may receive and successfully decode three overlapping ADS-B signals, where the third decoder may continue decoding an ADS-B signal that both the first and second decoders miss decoding.

Still other examples of this disclosure may include a fourth, fifth, sixth, or any number of decoders, where a fourth decoder may be configured to re-trigger twice and then stop re-triggering during overlapping signals, the fifth decoder may be configured to re-trigger three times and then stop re-triggering during overlapping signals, and so forth. In many applications, large numbers of decoders each with a different re-triggering setting will approach a point of diminishing additional advantage, as the probability of receiving ever higher numbers of overlapping surveillance signals (e.g., from various aircraft) may drop off exponentially. In other applications involving very high air traffic, particularly as may occur with growing volumes of unpiloted air traffic, the capacity to decode high numbers of overlapping surveillance signals may be substantially advantageous.

In some examples, one or more of ADS-B decoders 201, 202, 401, 402, 501, 502 may use a Mode S Extended Squitter data link operating at 1,090 MHz (1900 ES). In some examples, one or more of ADS-B decoders 201, 202, 401, 402, 501, 502 may also operate under standards promulgated by the Federal Aviation Administration (FAA) and the Radio Technical Commission for Aeronautics (RTCA), such as the DO-260B standard for 1900 ES (or ED-102A, the European equivalent). In some examples, second decoder 202, 402, 502 operates in accordance with the DO-260B/ED-102A standard, while first decoder 201, 401, 501 does not. Second decoder 202, 402, or 502 may therefore be configured to decode ADS-B message data from Mode S extended squitter ADS-B signals at 1,090 megahertz in accordance with the DO-260B/ED-102A standard.

Figure 6:
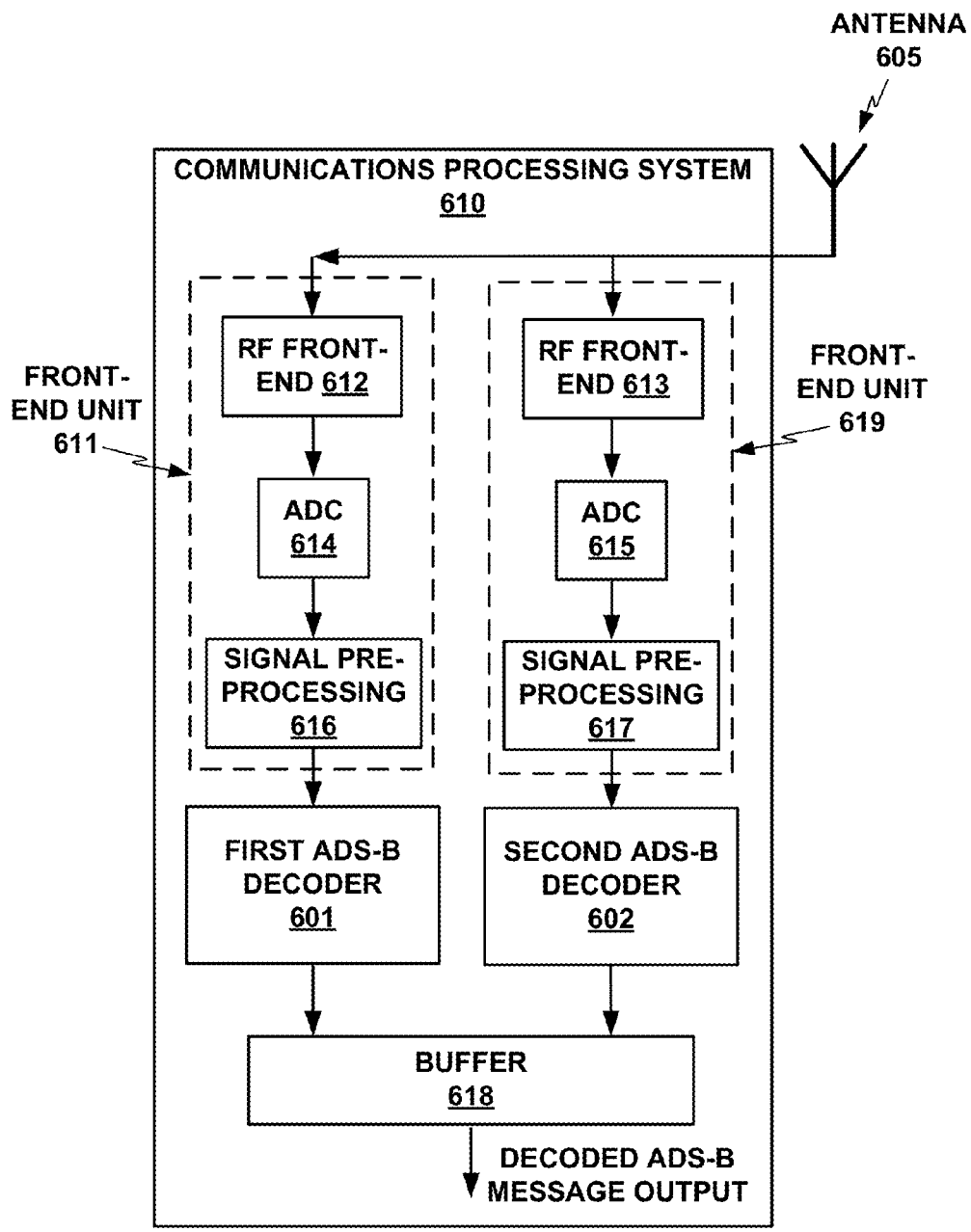
FIG. 6 depicts a functional block diagram of another example double decoder communications processing system with a first decoder and a second decoder.

FIG. 6 shows another example communications processing system 610 that is analogous in some ways to communications processing system 210 of FIG. 2 but that includes multiple, separate front-end units 611 and 619 for each ADS-B decoder 601, 602. Communications processing system 610 in this example includes antenna 605, first front-end unit 611 coupled to antenna 605, first ADS-B decoder 601 coupled to first front-end unit 611, second front-end unit 619 coupled to antenna 605, second ADS-B decoder 602 coupled to second front-end unit 619, and buffer 618 coupled to the outputs of both first and second ADS-B decoders 601, 602. First front-end unit 611 includes RF front-end 612, ADC 614, and signal pre-processing block 616 operatively coupled between antenna 605 and first ADS-B decoder 601. Second front-end unit 619 includes RF front-end 613, ADC 615, and signal pre-processing block 617 operatively coupled between antenna 605 and second ADS-B decoder 602.

In another example, one of front-end units 611, 619 may be coupled to a second antenna (not depicted in FIG. 6), such that antenna 605 is only coupled to front end unit 619, while the second antenna is only coupled to front end unit 611. In these examples, first ADS-B decoder 601 may then receive ADS-B signals from the front-end unit 611 coupled to the second antenna and decode those ADS-B signals to output decoded ADS-B messages data to buffer 618, and second ADS-B decoder 602 may receive ADS-B signals from the front-end unit 619 coupled to antenna 605 and decode those ADS-B signals to output decoded ADS-B messages data to buffer 618, as otherwise described above.

Figure 7:
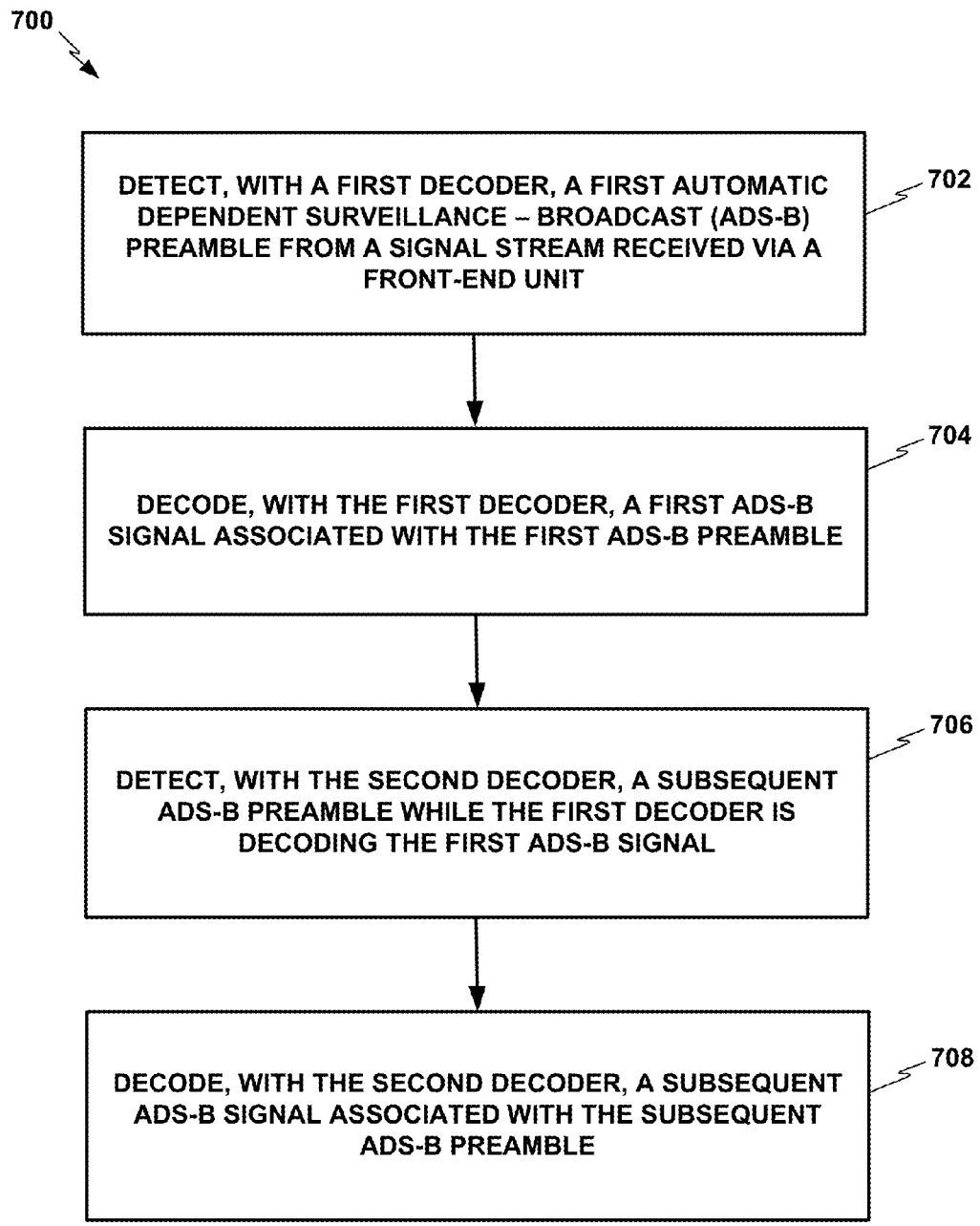
FIG. 7 shows a flowchart for a method of operating a communications processing system that may receive and decode overlapping radio surveillance signals in accordance with illustrative aspects of this disclosure.

FIG. 7 shows a flowchart for a method 700 for operating a communications processing system (e.g., communications processing systems 210, 410, 510, 610 of FIGS. 2, 4, 5, and 6) that may receive and decode overlapping ADS-B signals, in accordance with illustrative aspects of this disclosure. Method 700 includes detecting, with a first decoder, a first automatic dependent surveillance broadcast (ADS-B) preamble from a signal stream received via a front-end unit (702). Method 700 further includes decoding, with the first decoder, a first ADS-B signal associated with the first ADS-B preamble (704). Method 700 further includes detecting, with the second decoder, a subsequent ADS-B preamble while the first decoder is decoding the first ADS-B signal (706). Method 700 further includes decoding, with the second decoder, a subsequent ADS-B signal associated with the subsequent ADS-B preamble (708).

In some examples, method 700 may also include performing one or more of: receiving signals with a single antenna or multiple antennas, processing the signals with one or more RF front-ends of a front-end unit, converting the signals into digital form, and/or performing signal preprocessing by the front-end unit, prior to detecting the first ADS-B preamble with the first decoder (702). In some examples, method 700 may also include buffering decoded ADS-B message data, performing a duplicate check on decoded ADS-B message data, and/or providing decoded ADS-B message data to other systems, subsequent to decoding at least one ADS-B message data (704 and/or 708).

Elements of a communications processing system as disclosed above may be implemented in any of a variety of additional types of solid state circuit elements, such as application-specific integrated circuits (ASICs), a magnetic nonvolatile random-access memory (RAM) or other types of memory, a mixed-signal integrated circuit, a central processing unit (CPU), a field programmable gate array (FPGA), a digital signal processor (DSP), microcontroller, a programmable logic controller (PLC), a system on a chip (SoC), a subsection of any of the above, an interconnected or distributed combination of any of the above, or any other type of component or one or more components capable of being configured in accordance with any of the examples disclosed herein. A communications processing system as in any of the examples herein may provide additional advantages in any of a variety of applications, including any application in which radar is used. Any of communications processing systems 210, 410, 510, 610 of the examples of FIGS. 2, 4, 5, and 6 as described above, or any component thereof, may be implemented as a device, a system, an apparatus, and may embody or implement a method of decoding surveillance signals, including for implementing example method 700 as described with reference to FIG. 7. For purposes of this disclosure, ADS-B messages and data may be interpreted to include any radio surveillance messages and data based on any radio surveillance standard, including any modifications or extensions of ADS-B.

Various illustrative aspects of the disclosure are described above. These and other aspects are within the scope of the following claims.

The invention claimed is:

1. A system comprising:
   a first decoder communicatively coupled to a front-end unit; and
   a second decoder communicatively coupled to the front-end unit,
   wherein the first decoder and the second decoder are configured to:
   detect automatic dependent surveillance-broadcast (ADS-B) preambles from a signal stream received via the front-end unit;
   decode ADS-B signals associated with the ADS-B preambles; and
   output ADS-B message data based on the ADS-B signals,
   wherein the first decoder is configured to detect a first ADS-B preamble from the signal stream, and to decode a first ADS-B signal associated with the first ADS-B preamble,
   wherein the second decoder is configured to attempt to detect a subsequent ADS-B preamble while the first decoder is decoding the first ADS-B signal, and to decode a subsequent ADS-B signal associated with the subsequent ADS-B preamble, and
   wherein the system is further configured to enable the second decoder when the first decoder is decoding the first ADS-B signal, and to disable the second decoder when the first decoder is finished decoding the first ADS-B signal.

2. The system of claim 1, wherein the second decoder is further configured to:
   begin decoding the first ADS-B signal associated with the first ADS-B preamble;
   attempt to detect subsequent ADS-B preambles while decoding the first ADS-B signal; and in response to detecting a subsequent ADS-B preamble while decoding the first ADS-B signal, to stop decoding the first ADS-B signal and instead to decode the subsequent ADS-B signal.

3. The system of claim 1, wherein enabling the second decoder comprises enabling preamble detection logic of the second decoder, and wherein disabling the second decoder comprises disabling the preamble detection logic of the second decoder.

4. The system of claim 1, further comprising a buffer communicatively coupled to both the first decoder and the second decoder, wherein the first decoder and the second decoder are both configured to communicate ADS-B message data to the buffer, wherein the ADS-B message data are based on the decoding of the ADS-B signals.

5. The system of claim 4, wherein the buffer is configured to check for duplicate ADS-B message data among ADS-B message data the buffer receives from the first decoder and the second decoder, and to output only a single copy of a set of duplicate ADS-B message data.

6. The system of claim 1, wherein the front-end unit is coupled to an antenna, and the signal stream received by the front-end unit via the antenna and processed by the front-end unit, prior to the first decoder and the second decoder receiving the signal stream from the front-end unit.

7. The system of claim 1, wherein the front-end unit comprises:
an RF front-end communicatively coupled to an antenna;
an analog-to-digital converter (ADC) communicatively coupled to the RF front-end; and
a signal pre-processing block communicatively coupled to the ADC.

8. The system of claim 1, wherein the first decoder is configured to decode the first ADS-B signal from Mode S extended squitter signals at 1,090 megahertz from the signal stream.

9. The system of claim 1, wherein the second decoder is configured to decode the ADS-B message data from Mode S extended squitter ADS-B signals at 1,090 megahertz from the signal stream in accordance with the DO-260B or ED-102A standard.

10. The system of claim 1, wherein the subsequent ADS-B signal is a first subsequent ADS-B signal, wherein the second decoder is further configured to continue attempting to detect ADS-B preambles while the second decoder is decoding the first subsequent ADS-B signal and, if the second decoder detects a second subsequent ADS-B preamble while the second decoder is decoding the first subsequent ADS-B signal, the second decoder stops decoding the first subsequent ADS-B signal and instead decodes the second subsequent ADS-B signal.

11. A method comprising:
detecting, with a first decoder of a communication processing system, a first automatic dependent surveillance-broadcast (ADS-B) preamble from a signal stream received via a front-end unit;
decoding, with the first decoder, a first ADS-B signal associated with the first ADS-B preamble;
detecting, with a second decoder of the communication processing system, a subsequent ADS-B preamble from the signal stream while the first decoder is decoding the first ADS-B signal;
decoding, with the second decoder, the subsequent ADS-B signal associated with the subsequent ADS-B preamble;
enabling, with one or more processors of the communication processing system, the second decoder when the first decoder is decoding the first ADS-B signal; and
disabling, with the one or more processors, the second decoder when the first decoder is finished decoding the first ADS-B signal.

12. The method of claim 11, wherein enabling the second decoder comprises enabling preamble detection logic of the second decoder, and wherein disabling the second decoder comprises disabling the preamble detection logic of the second decoder.

13. The method of claim 11, further comprising:
outputting, with the first decoder, a first set of ADS-B message data based on the decoding of the first ADS-B signal; and
outputting, with the second decoder, a second set of ADS-B message data based on the decoding of the subsequent ADS-B signal.

14. The method of claim 13, further comprising:
checking for duplicate ADS-B message data among the first and second sets of ADS-B message data outputted by the first decoder and the second decoder; and
communicating only a single copy of a set of duplicate ADS-B message data.

15. A system comprising:
a front-end unit;
a first means for decoding communicatively coupled to the front-end unit; and
a second means for decoding communicatively coupled to the front-end unit,
wherein the first means for decoding and the second means for decoding both comprise means for detecting preambles from a signal stream received via the front-end unit and to decode ADS-B message data from the signals;
means for detecting a first radio surveillance preamble from a signal stream received via a front-end unit;
means for decoding the first radio surveillance signal associated with the first radio surveillance preamble;
means for detecting a subsequent radio surveillance preamble while the means for decoding the first radio surveillance signal is decoding the first radio surveillance signal;
means for decoding a subsequent radio surveillance signal associated with the subsequent radio surveillance preamble;
means for enabling the means for detecting the subsequent radio surveillance preamble when the means for decoding the first radio surveillance signal is decoding the first radio surveillance signal; and
means for disabling the means for detecting the subsequent radio surveillance preamble when the means for decoding the first radio surveillance signal is finished decoding the first radio surveillance signal.

16. The system of claim 15, further comprising:
means for outputting a first set of radio surveillance message data to a buffer, wherein the first set of radio surveillance message data is based on the decoding of the first radio surveillance signal;
means for outputting a second set of radio surveillance message data to the buffer, wherein the second set of radio surveillance message data is based on the decoding of the subsequent radio surveillance signal;
means for checking for duplicate radio surveillance message data among the first and second sets of radio surveillance message data; and means for communicating only a single copy of a set of duplicate radio surveillance message data.

* * * * *